C. G. OLSON AND N. TRBOJEVICH.
SCREW CUTTING AND RELIEVING MACHINE.
APPLICATION FILED JUNE 27, 1919.
1,384,913.
Patented July 19, 1921.
4 SHEETS—SHEET 1.
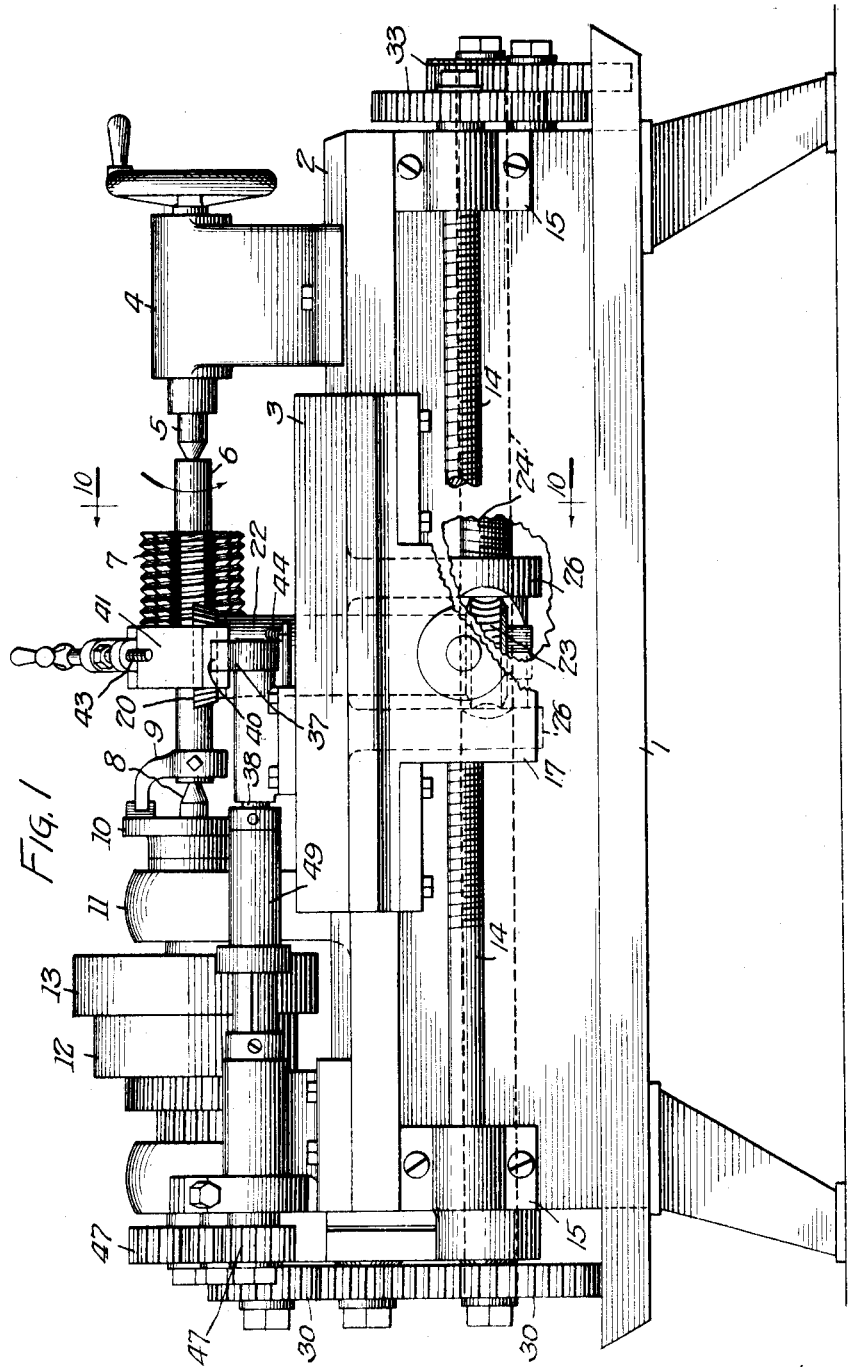
INVENTORS
CARL G. OLSON,
NIKOLA TRBOJEVICH,
BY Cheever & Cox ATTYS.

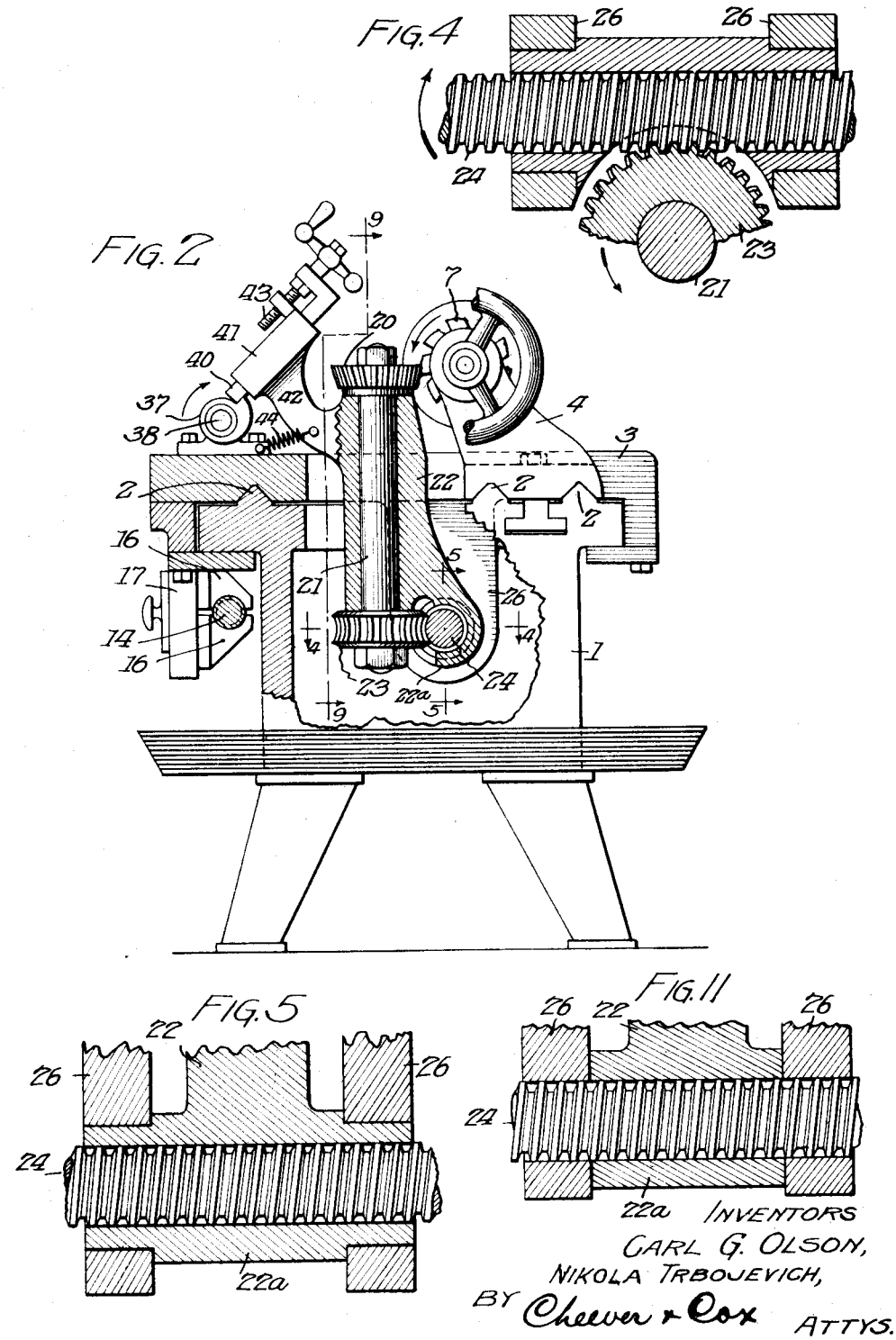

C. G. OLSON AND N. TRBOJEVICH.
SCREW CUTTING AND RELIEVING MACHINE.
APPLICATION FILED JUNE 27, 1919.
1,384,913.
Patented July 19, 1921.
4 SHEETS—SHEET 3.
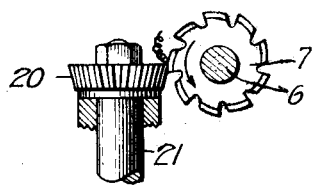
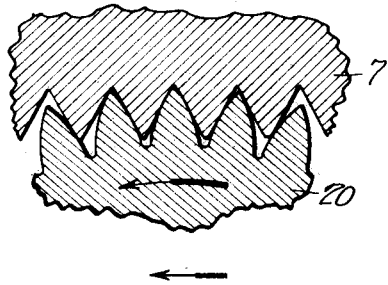
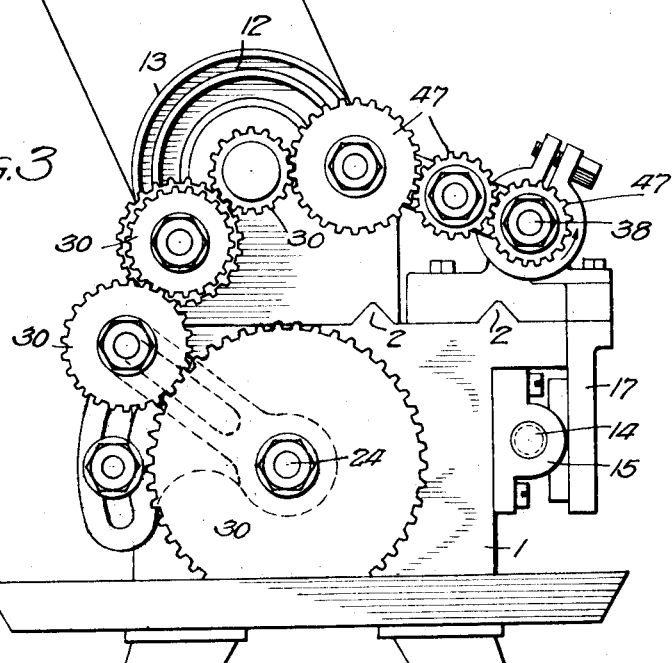
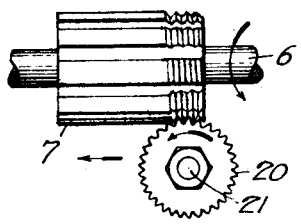
INVENTORS
CARL G. OLSON,
NIKOLA TRBOJEVICH,
BY Chever & Cox ATTYS.

C. G. OLSON AND N. TRBOJEVICH.
SCREW CUTTING AND RELIEVING MACHINE.
APPLICATION FILED JUNE 27, 1919.
1,384,913.
Patented July 19, 1921.
4 SHEETS—SHEET 4.
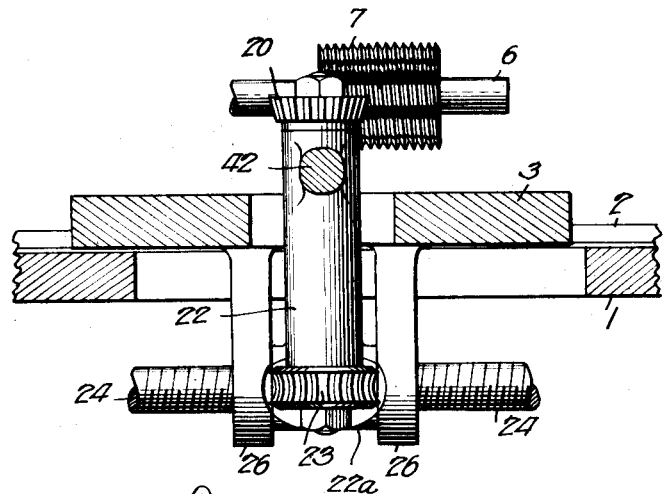
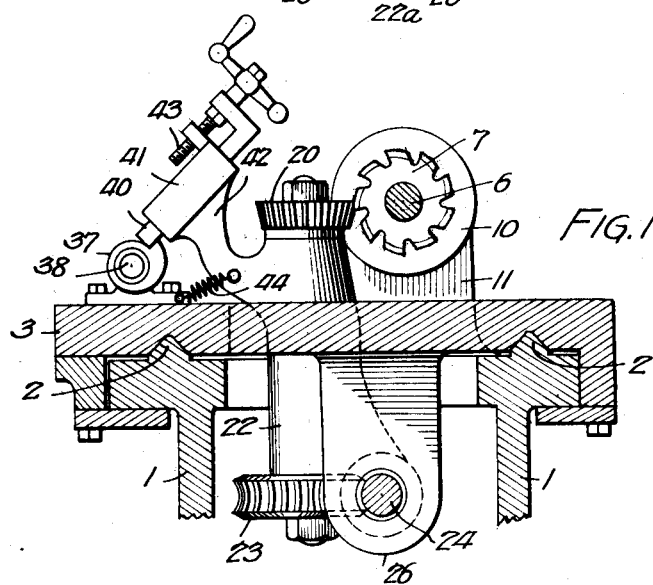
INVENTORS
CARL G. OLSON,
NIKOLA TRBOJEVICH,
BY Cheever & Cox ATTYS.

UNITED STATES PATENT OFFICE.

CARL G. OLSON AND NIKOLA TRBOJEVICH, OF CHICAGO, ILLINOIS, ASSIGNORS TO ILLINOIS TOOL WORKS, OF CHICAGO, ILLINOIS, A CORPORATION OF ILLINOIS.

SCREW CUTTING AND RELIEVING MACHINE.

1,384,913.          Specification of Letters Patent.       Patented July 19, 1921.

Application filed June 27, 1919. Serial No. 307,082.

*To all whom it may concern:*

Be it known that we, CARL G. OLSON, a citizen of the United States of America, and NIKOLA TRBOJEVICH, a subject of the King of Jugo-Slavia, both residing at Chicago, in the county of Cook and State of Illinois, have invented a certain new and useful Improvement in Screw Cutting and Relieving Machines, of which the following is a specification.

This invention relates to machine tools and has a considerable variety of applications. In the highly developed form shown in the drawings, it is capable of generating hobs and taps which have, as usual, relieved teeth helically arranged. In a more simplified form the machine is adapted to generate a plain helical thread upon a cylindrical blank. Our machine is also capable of producing plain rings upon a cylindrical blank, the finished article constituting what might be termed a "cylindrical rack." The general object of the invention is to provide a machine having the capabilities above indicated and to couple these with simplicity, durability, and expeditious operation. In carrying out the invention in the illustrated form the cutter is in the general form of a gear wheel, that is, the cutting teeth are identical in form and are symmetrically located with respect to the cutter axis. In practice the cutter is rotated so that the teeth are presented to the work one after the other, thus greatly prolonging the life of the cutter over one which has but a single tooth. In my machine, in addition to its rotary movement, the cutter has a bodily movement or movement of translation in which the center of the cutter travels parallel to the axis of the work. This is accomplished by mounting the cutter upon a traveling carriage, the travel whereof is produced by the rotation of a feed screw. The cutter is rotated about its axis by means of positive acting mechanism here shown as consisting of a worm gear rigidly connected with the cutter and coöperating with a worm or lead screw. This lead screw is capable of rotating about its axis but is otherwise stationary. For cutting cylindrical racks and like objects the lead screw does not rotate and the rotation of the cutter is produced simply as a result of the travel of the carriage;—which causes the worm gear to roll along the lead screw. But in producing threaded objects, the lead screw itself rotates, and the worm gear is driven by the lead screw at the same time that it rolls along it. In the case of taps and hobs the teeth are not only arranged helically but are relieved. In the illustrated form of my machine the cutter is mounted in a rocking frame and means are provided for rocking the frame in such a manner as to reciprocate the cutter toward and from the work to produce the relief of the teeth thereof. This movement of the rocking frame is produced by means of a rotating cam. Incidentally, it may be noted that in the machine shown, the pitch diameter of the cutter is substantially equal to the pitch diameter of the worm gear; also that the axis of the worm or lead screw is also the axis of oscillation of the rocking frame.

In the accompanying drawings which illustrate one form of this invention—

Figure 1 is a front elevation of the complete machine, a small portion at the front being broken away to reveal a portion of the mechanism within.

Fig. 2 is an elevation of the machine looking toward the left in Fig. 1. Certain of the parts are shown in vertical section on the plane passing through the axis of the cutter spindle.

Fig. 3 is an end elevation of the machine looking toward the right in Fig. 1.

Fig. 4 is a plan section on line 4—4, Fig. 2.

Fig. 5 is a vertical section on the line 5—5, Fig. 2.

Fig. 6 is a detail, more or less diagrammatic in its nature, indicating the manner in which the cut is taken.

Fig. 7 is a detail also in the nature of a diagram showing the direction of rotation and translation of the different parts in generating a threaded piece of work.

Fig. 8 is a fragmentary detail, also diagrammatic in its nature, illustrating the principle upon which the cutter teeth generate the rings or thread upon the work.

Fig. 9 is a sectional elevation on the line 9—9, Fig. 2.

Fig. 10 is a sectional elevation on the line 10—10, Fig. 1.

Fig. 11 is a detail showing a modification in the lower portion of the rocking frame.

Like numerals denote like parts throughout the several views.

To now describe in detail the present embodiment of the invention, the main frame 1 is provided with longitudinal slides 2, 2 on which the tool carriage 3 is supported and guided. At one end of the machine there is a tail stock 4 having a tail stock center 5 for supporting one end of the arbor 6 on which the piece of work 7 is mounted. The opposite end of the arbor is supported upon a head stock center 8 and is rotated by means of a dog 9 engaged by the face plate 10 adjacent to the head stock 11. Any suitable source of power may be employed for rotating the face plate, and in the present case two pulleys 12 and 13, are employed for the purpose. They are of different sizes to obtain different speeds.

The tool carriage 3 is caused to travel along the slides 2, 2 by means of a feed screw 14. This screw is journaled in stationary brackets 15, 15 and is engaged by the two halves of a split nut 16, carried by an apron 17 depending from the front of the carriage, as best shown in Figs. 1, 2, and 3.

The cutter 20 resembles a bevel gear in outline and the bevel is preferably approximately 15°, the purpose being to provide the necessary clearance. The cutter is rigidly fastened to a spindle 21 which is arranged vertically and is journaled in a rocking frame 22, as best shown in Fig. 2. A worm gear 23 is rigidly fastened to the lower end of the spindle and coöperates with a worm or lead screw 24. By reference especially to Figs. 4, 5, and 9, it will be seen that carriage 3 has a pair of preferably integral brackets 26, 26 extending downward from it. These are bored horizontally at their lower end to receive the shouldered ends of a hub 22ª formed at the bottom of the frame 22. On account of this shouldered construction the rocking frame travels in unison with the carriage and at the same time is able to oscillate in the carriage transversely to the direction of travel thereof. The hub itself is longitudinally bored to accommodate and slide upon the lead screw 24. The bore in the hub is coaxial with the bore in the brackets 26 and hence the axis of oscillation of the rocking frame is coincident with the axis of the lead screw. In the preferred construction the points of the teeth of the lead screw are not sharp but are flat and hence present a greater wearing surface to the hub of the rocking frame. It will be evident, however, by reference to Fig. 11, that if desired the reduced ends of hub 22ª may be omitted and the rocking frame may be supported entirely by the lead screw and the lead screw itself may be supported in part by the brackets 26.

The lead screw 24 is rotated by means of a train of change speed gears 30, best shown in Figs. 1 and 3. These are driven from the main shaft (not shown) to which the pulleys 12, 13 are fastened. The feed screw 14, previously mentioned, is driven by a train of gears 33, shown at the right end of Fig. 1. Said gears connect the lead screw 24 with said feed screw 14. The train 33 is also a change speed train so that any desired speed ratios may be obtained.

As previously stated, when hobs, taps, or other articles having relieved teeth are to be generated, the cutter 20 is reciprocated toward and from the work by rocking the frame 22 about its axis. This is accomplished by means of a cam 37 rigidly fastened to a cam shaft 38 journaled in suitable bearings mounted upon the tool carriage. Said cam engages a bar 40 slidably mounted in a housing 41 formed at the outer end of arm 42 which is preferably integral with the rocking frame 22. The position of bar 40 in the housing 14 is controlled by means of an adjusting screw 43 best shown in Figs. 1, 2, and 10. The bar is held in close contact with the acting surface of the cam at all times by means of a tension spring 44. Cam shaft 38 is driven by a train of change speed gears 47, shown in Fig. 3 and the left end of Fig. 1. These gears are driven from the main shaft of the machine. In order to permit the carriage and cam to travel and at the same time be driven by the non-traveling gear train, the cam shaft is formed in two parts which are joined by a splined sleeve 49, best shown in Fig. 1.

In operation, if it were desired to generate plain rings upon the work the lead screw 24 would be prevented from rotating and the travel of the carriage would simply cause the worm gear 23 to roll along the lead screw 24. The present machine, however, is particularly designed for generating articles such as hobs and taps for the production of which the cuts must be taken helically. Consequently, during the operation of the machine illustrated, to produce hobs or taps the lead screw as well as the arbor, feed screw and cam shaft rotates. The peripheral speed of the cutter conforms with the axial lead of the thread to be cut, therefore, when the cutter is engaged with the work a thread is formed and the cutter may be carried along to form a thread of considerable length. By properly adjusting the speed ratios of the gear trains any desired rate of feed or travel of the tool carriage may be obtained; in fact, by holding the feed screw against rotation the cutter may be caused to rotate in one place. As the cam 37 rotates it causes the cutter to reciprocate back and forth away from and toward the work, thus producing an eccentric cut in the work. When hobs or taps are to be produced, the blank will be previously gashed in a manner which will be understood by those familiar with hobs and hobbing.

It will be evident that by thus employing a multiple tooth cutter, the cutter may be used much longer without resharpening than in the case of cutters having but a single tooth. The machine is calculated also to produce especially accurate work if desired. To illustrate, by rotating the work at relatively high speed and rotating the feed screw at relatively low speed, very small cuts will be taken, which in itself makes for accuracy of work. By reducing the rotation of the feed screw to zero, however, the cutter may be made to rotate *in situ* until all of the teeth of the cutter have engaged the work *seriatim*. This will produce a thread upon the work representing, so to speak, the composite shape of all the cutter teeth, thus eliminating any inaccuracies which might exist in any single tooth of the cutter. Of course, substantially the same effect will be produced by causing the feed screw to rotate very slowly.

It will be observed that in our machine the piece of work will be completely finished when the cutter has made but a single trip lengthwise of it, that is to say, the cutter travels along the work but once in order to finish it completely. This saves time over that class of thread producing machines in which the tool passes over the work a number of times, each time taking a deeper cut.

It will be understood that the particular mechanism employed for driving the lead screw, feed screw, the cam shaft is immaterial, the essential characteristic being that these parts shall rotate in timed relation and that various speed ratios shall be obtainable, including such ratios as will permit the lead screw to remain still for producing rings or cylindrical racks and to permit the feed screw to rotate at slow or high speeds.

Having thus described our invention what we claim as new and desire to secure by Letters Patent, is:

1. In a machine for generating threads on cylindrical blanks, a cutter resembling a bevel gear, a work holder adapted to rotate the work in such direction that the portion momentarily in contact with the cutter moves approximately perpendicularly to the plane of the cutter, and positive acting means for rotating the cutter at a peripheral speed equivalent to the lead of the thread desired in the work.

2. In a machine tool a multiple tooth cutter resembling a gear wheel, a work holder adapted to rotate the work in such direction that the portion momentarily in contact with the cutter moves approximately perpendicular to the plane of the cutter, means for feeding the cutter bodily in a direction parallel with the axis of the work, and means for simultaneously rotating the cutter about its axis.

3. In a machine for generating threads on cylindrical blanks, a multiple tooth cutter having substantially identical teeth arranged in a circle about the cutter axis, a work holder adapted to rotate the work in such direction that the portion momentarily in contact with the cutter moves approximately perpendicular to the plane of the cutter, means for feeding the cutter bodily in a direction parallel with the axis of the work, and means for simultaneously rotating the cutter about its axis at such speed and in such direction that the portion of the cutter momentarily in contact with the work will move faster than the axis of the cutter and in the same direction that the axis of the cutter is moving, whereby a helical thread is produced upon the work.

4. In a machine for generating threads on cylindrical blanks, a multiple tooth cutter having substantially identical teeth arranged in a circle about the cutter axis, a work holder adapted to rotate the work in such direction that the portion momentarily in contact with the cutter moves approximately perpendicular to the plane of the cutter, means for feeding the cutter bodily in a direction parallel with the axis of the work, a worm gear rigidly fastened to the cutter for rotating it, a lead screw coöperating with said worm gear and means for rotating said lead screw.

5. A machine tool adapted to generate threads upon a cylindrical blank, having a work holder adapted to rotate the blank about its axis, a multiple tooth cutter resembling a gear wheel, the axis of the work lying approximately in the plane of rotation of the cutter, a carriage for causing the cutter to travel lengthwise of the work, a lead screw arranged parallel with the axis of the work, and a worm gear connected to the cutter for rotating it, said cutter coöperating with the lead screw to roll along it and to be simultaneously rotated by it.

6. A machine tool adapted to generate threads upon a cylindrical blank, having a work holder adapted to rotate the blank about its axis, a multiple tooth cutter, a carriage wherein the cutter is mounted, a feed screw for causing the carriage to travel parallel to the work, a worm gear rigidly fastened to the cutter and coöperating with the lead screw, the travel of the carriage being adapted to cause the worm gear to roll along the lead screw, and means for rotating the lead screw.

7. A machine tool adapted to generate threads upon a cylindrical blank, having a work holder adapted to rotate the blank about its axis, a multiple tooth cutter resembling a bevel gear, a carriage wherein the cutter is mounted, a feed screw for causing the carriage to travel parallel to the work, a spindle rigidly fastened to the cutter, a worm gear rigidly fastened to the spindle, a lead screw in the form of a worm arranged parallel with the axis of the work, the worm gear meshing with the lead screw and adapted to roll along it, and means for rotating the lead screw for rotating the worm gear and cutter.

8. A machine tool adapted to generate threads upon a cylindrical blank, having a work holder adapted to rotate the blank about its axis, a multiple tooth cutter resembling a bevel gear, a carriage wherein the cutter is mounted, a feed screw for causing the carriage to travel parallel to the work, a spindle rigidly fastened to the cutter, a worm gear rigidly fastened to the spindle, a lead screw in the form of a worm arranged parallel with the axis of the work, the worm gear meshing with the lead screw and adapted to roll along it, and means adapted to rotate the lead screw in a direction and at a speed such that the point of the cutter momentarily in contact with the work moves in the same direction as the carriage and at a faster rate.

9. In a machine tool adapted to generate threads upon a cylindrical blank, the combination of a work holder adapted to rotate the blank, a multiple tooth cutter resembling a gear wheel, a carriage wherein the cutter is mounted, a feed screw for causing the carriage to travel, a gear wheel parallel to the cutter and rigidly fastened to it and having a diameter substantially equal to its diameter, and a non-traveling member engaged by said gear wheel and arranged parallel to the axis of the work, said nontraveling member having projections adapted to engage the teeth of the gear wheel whereby said gear wheel is caused to roll along said nontraveling member by the travel of the carriage.

10. In a machine tool adapted to generate threads upon a cylindrical blank, the combination of a work holder adapted to rotate the blank, a multiple tooth cutter resembling a gear wheel, a carriage wherein the cutter is mounted, a feed screw for causing the carriage to travel, a worm gear connected to the cutter for rotating it, a lead screw in the form of a worm arranged parallel to the work, said lead screw coöperating with said worm gear, and means for rotating the feed screw and the lead screw at various relative rates of speed.

11. In a machine for producing hobs, a cutter resembling a bevel gear, a work holder adapted to rotate the work in such direction that the portion momentarily in contact with the cutter moves approximately perpendicularly to the plane of the cutter, positive acting means for rotating the cutter at a peripheral speed equivalent to the lead of the hob teeth and means operating in timed relation with the work holder for periodically and automatically moving the cutter approximately radially toward and from the work.

12. In a machine tool a multiple tooth cutter resembling a gear wheel, a work holder adapted to rotate the work in such direction that the portion momentarily in contact with the cutter moves approximately perpendicular to the plane of the cutter, means for feeding the cutter bodily in a direction parallel with the axis of the work, means for simultaneously rotating the cutter about its axis, and means for periodically moving the cutter bodily approximately radially toward and from the work.

13. In a screw cutting and relieving machine, a multiple tooth cutter resembling a bevel gear wheel, a work holder adapted to rotate the work in such direction that the portion momentarily in contact with the cutter moves approximately perpendicular to the plane of the cutter, means for feeding the cutter bodily in a direction parallel with the axis of the work, means for simultaneously rotating the cutter about its axis, and means operating in timed relation with the work holder for simultaneously and automatically reciprocating the cutter toward and from the work.

14. A hob cutting machine, having a work holder adapted to rotate the blank about its axis, a multiple tooth cutter resembling a gear wheel, the axis of the work lying approximately in the plane of rotation of the cutter, a carriage for causing the cutter to travel lengthwise of the work, a lead screw arranged parallel with the axis of the work, a worm gear connected to the cutter for rotating it, said cutter coöperating with the lead screw to roll along it and to be simultaneously rotated by it, and means for simultaneously reciprocating the cutter toward and from the work.

15. A hob cutting machine, having a work holder adapted to rotate the blank about its axis, a multiple tooth cutter resembling a bevel gear, a carriage wherein the cutter is mounted, a feed screw for causing the carriage to travel parallel to the work, a spindle rigidly fastened to the cutter, a worm gear rigidly fastened to the spindle, a lead screw in the form of a worm arranged parallel with the axis of the work, the worm gear meshing with the lead screw and being adapted to roll along it, means for rotating the lead screw for rotating the work gear and cutter, and means for simultaneously reciprocating the cutter toward and from the work.

In witness whereof we have hereunto subscribed our names.

CARL G. OLSON.
NIKOLA TRBOJEVICH.